(12) United States Patent
Kaplita et al.

(10) Patent No.: US 10,812,540 B2
(45) Date of Patent: Oct. 20, 2020

(54) FORWARDING A COMMUNICATION TRANSMITTED TO A PORTABLE COMMUNICATIONS DEVICE BASED ON TALKGROUP AFFILIATION AND OVERRIDE SETTINGS

(71) Applicant: MOTOROLA SOLUTIONS, INC., Chicago, IL (US)

(72) Inventors: Grzegorz Kaplita, Rzeszow (PL); Jaroslaw Swierczynski, Cracow (PL); Radoslaw Sztando, Cracow (PL)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 0 days.

(21) Appl. No.: 15/781,915

(22) PCT Filed: Dec. 28, 2015

(86) PCT No.: PCT/PL2015/050076
§ 371 (c)(1),
(2) Date: Jun. 6, 2018

(87) PCT Pub. No.: WO2017/116246
PCT Pub. Date: Jul. 6, 2017

(65) Prior Publication Data
US 2018/0367582 A1    Dec. 20, 2018

(51) Int. Cl.
*H04L 12/54* (2013.01)
*H04L 29/06* (2006.01)
(Continued)

(52) U.S. Cl.
CPC .......... *H04L 65/1096* (2013.01); *H04L 12/54* (2013.01); *H04L 49/252* (2013.01);
(Continued)

(58) Field of Classification Search
CPC ........... H04L 29/06734; H04L 67/1044; H04L 12/54; H04L 49/252; H04W 4/08; H04W 52/28; H04N 1/00896
See application file for complete search history.

(56) References Cited

U.S. PATENT DOCUMENTS 6,611,684 B1    8/2003    Franks
7,653,191 B1    1/2010    Glasser et al.
(Continued)

FOREIGN PATENT DOCUMENTS

EP    2211587    7/2010
GB    2371446    7/2002

OTHER PUBLICATIONS

PCT/PL2015/050076 International Search Report and Written Opinion of the International Searching Authority dated Oct. 5, 2016 (15 pages).

(Continued)

*Primary Examiner* — Salvador E Rivas
(74) *Attorney, Agent, or Firm* — Michael Best & Friedrich LLP

(57) ABSTRACT

Methods, apparatuses, and systems for forwarding a communication transmitted to a portable communications device. One method includes affiliating the portable communications device with a talkgroup, and, in response to affiliating the portable communications device with the talkgroup, receiving, at an electronic processor included in the portable communications device, forwarding configuration data associated with the talkgroup. The method also includes forwarding a communication transmitted to the portable communications device while the portable communications device is affiliated with the talkgroup based on the forwarding configuration data associated with the talkgroup and one or more override settings.

18 Claims, 4 Drawing Sheets

(51) Int. Cl.
*H04L 29/08* (2006.01)
*H04M 3/51* (2006.01)
*H04M 3/54* (2006.01)
*H04W 4/10* (2009.01)
*H04W 4/50* (2018.01)
*H04L 12/947* (2013.01)
*H04M 1/00* (2006.01)
*H04N 1/00* (2006.01)
*H04W 52/28* (2009.01)

(52) U.S. Cl.
CPC ........ *H04L 65/403* (2013.01); *H04L 65/4061* (2013.01); *H04L 67/34* (2013.01); *H04M 3/5116* (2013.01); *H04M 3/54* (2013.01); *H04W 4/10* (2013.01); *H04W 4/50* (2018.02); *H04M 1/006* (2013.01); *H04M 2203/2005* (2013.01); *H04N 1/00896* (2013.01); *H04W 52/28* (2013.01)

(56) References Cited

U.S. PATENT DOCUMENTS

| | | |
|---|---|---|
| 8,654,958 B2 | 2/2014 | Bhagavatula et al. |
| 8,781,094 B2 | 7/2014 | Ramanathan et al. |
| 9,098,177 B2 | 8/2015 | Das |
| 2008/0171567 A1* | 7/2008 | Kossi .................... H04W 88/04 455/518 |
| 2009/0154659 A1* | 6/2009 | Morin ................. H04L 12/1818 379/48 |
| 2010/0240378 A1* | 9/2010 | Wang ................. H04L 12/1827 455/445 |
| 2012/0135741 A1* | 5/2012 | Zhou ....................... H04L 5/005 455/450 |

OTHER PUBLICATIONS

3GPP TR 23.779, "3rd Generation Partnership Project; Technical Specification Group Services and System Aspects; Study on application architecture to support Mission Critical Push to Talk over LTE (MCPTT) services, (Release 13)" dated Mar. 2015, XP050965169, URL:http://www.3gpp.org/ftp/tsg_sa/v/G6_MisIsionCritical/TSGS6-003SanJoseDelCabo/docs 5.1.3 Solution 1-3: Application Level Device to Device Relay Operation for Off Network MCPTT; p. 18-p. 25.

ETSI, "Digital cellular telecommunications system; Call Forwarding (CF) supplementary services—Stage 3," ETS 300 952 (GSM 04.82 version 5.0.1): May 1997, pp. 1-42.

* cited by examiner

FORWARDING A COMMUNICATION TRANSMITTED TO A PORTABLE COMMUNICATIONS DEVICE BASED ON TALKGROUP AFFILIATION AND OVERRIDE SETTINGS

BACKGROUND OF THE INVENTION

Wireless communication networks support communications between portable communications devices. In some wireless communication networks, for example, land mobile radio (LMR) networks, the portable communications devices communicate with each other in talkgroups. A talkgroup is a group of portable communications devices (e.g., created by an administrator), in which each portable communications device in the talkgroup may participate in a group communication (e.g., a group call). Group calls may be initiated and managed, for example, at a call controller.

In some embodiments, a talkgroup may include members of one or more public safety organizations that are assigned to a public safety incident (e.g., a fire, a traffic accident, and the like). Depending on the incident, members of the talkgroup may need to focus on the incident and, therefore, should not be receiving communications associated with other talkgroups or communications received on other communication networks than the communication network associated with the talkgroup. For example, portable communications devices used by public safety organizations often communicate over a first network (e.g., a radio network) and a second network (e.g., a cellular network). When a member of a public safety organization is assigned to a talkgroup on the first network, it may be distracting for the member to receive a communication on the first network not associated with the assigned talkgroup or receive a communication on the second network. However, there may also be times when a member of a public safety organization needs to receive a communication even though the member is assigned to a particular talkgroup. For example, a supervisor included in a talkgroup may need to receive communications related to other talkgroups or other incidents that the supervisor may be managing.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
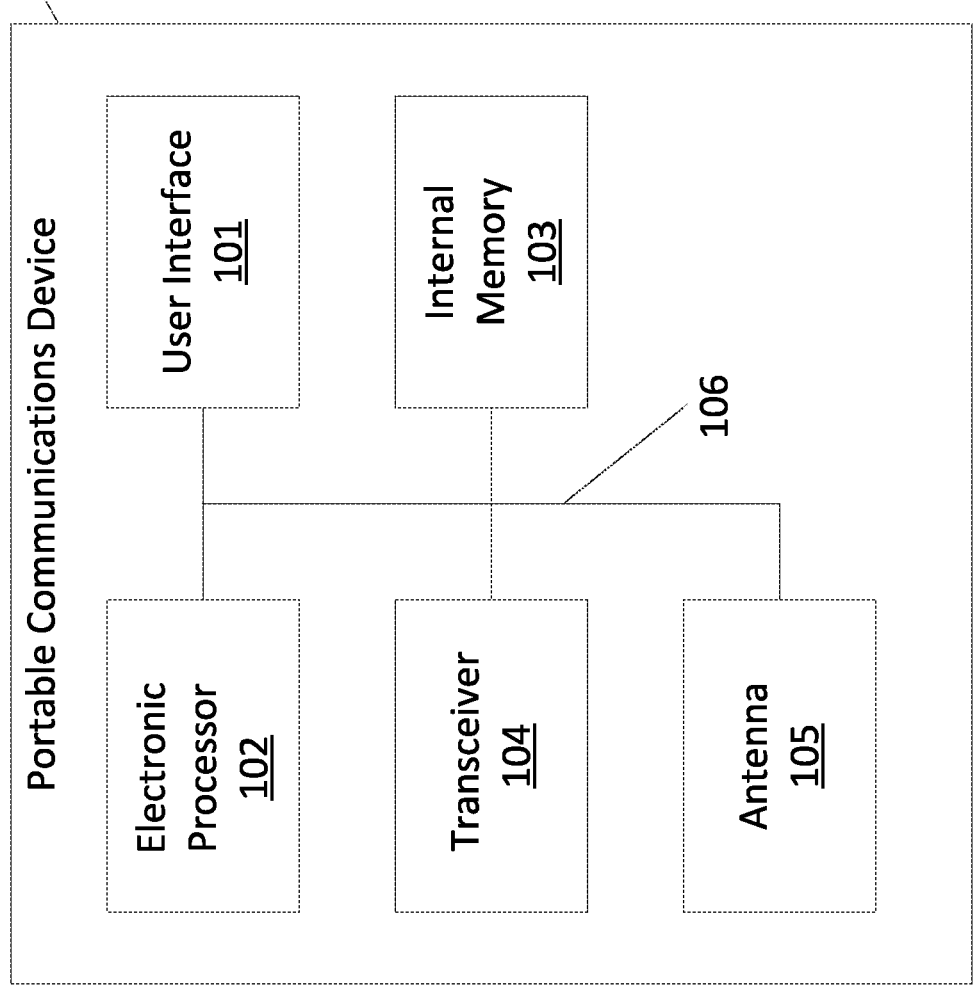
FIG. 1 is a block diagram of a portable communications device in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

One embodiment provides a method of forwarding a communication transmitted to a portable communications device. The method includes affiliating the portable communications device with a talkgroup, and, in response to affiliating the portable communications device with the talkgroup, receiving, at an electronic processor included in the portable communications device, forwarding configuration data associated with the talkgroup. The method also includes forwarding a communication transmitted to the portable communications device while the portable communications device is affiliated with the talkgroup based on the forwarding configuration data associated with the talkgroup and one or more override settings.

Another embodiment provides a portable communications device including a user interface for selecting a talkgroup, an electronic processor, and a memory coupled to the electronic processor. The memory containing instructions that, when executed by the electronic processor, perform a set of functions including, in response to selecting the talkgroup, receiving forwarding configuration data associated with the talkgroup, and forwarding a communication transmitted to the portable communications device while the portable communications device is affiliated with the talkgroup based on the forwarding configuration data associated with the talkgroup and one or more override settings.

FIG. 1 is a block diagram of a portable communications device 100. The portable communications device 100 may be a smart telephone, a mobile radio, a cellular telephone, a smart watch, a tablet computer, a personal digital assistant (PDA), and the like. In some embodiments, the portable communications device 100 is used in public safety operations by public safety personnel, such as, for example, firefighters, emergency first responders, and police officers, to communicate over one or more wireless communication networks.

As illustrated in FIG. 1, the portable communications device 100 includes a user interface 101, an electronic processor 102, an internal memory 103, a transceiver 104, and an antenna 105. The user interface 101, the electronic processor 102, the internal memory 103, the transceiver 104, and the antenna 105 communicate over one or more wired or wireless connections (e.g., a communication bus 106). It should be understood that FIG. 1 illustrates one exemplary embodiment of the portable communications device 100. In other embodiments, the portable communications device 100 may include additional, fewer, or other components. Also, in some embodiments, the portable communications device 100 performs functionality in addition to the functionality described herein.

The internal memory 103 includes a non-transitory computer readable medium that stores instructions executable by the electronic processor 102. In some embodiments, the internal memory 103 also stores data. For example, in some embodiments, the internal memory 103 stores data similar to that stored in the controller internal memory 203 (e.g. forwarding configuration data, a plurality of talkgroup identifiers, a status for each of the plurality of talkgroup identifiers, a status of an incident associated with each of the plurality of talkgroup identifiers, a user role, and the like). The plurality of talkgroup identifiers may specify one or more available talkgroups (e.g., identifiers of available talkgroups with an assigned frequency or communication channel), and the stored forwarding configuration data may apply to one or more of the available talkgroups. As described in more detail below, the forwarding configuration data may specify whether and how a communication transmitted to the portable communications device 100 should be forwarded to another destination (e.g., another portable communications device, a dispatch controller, a voice mail server, and the like).

In some embodiments, the internal memory 103 also stores one or more override settings. As described in more detail below, the override settings may modify the forwarding configuration data to allow the forwarding configuration data to be dynamically customized for the talkgroup, the incident associated with the talkgroup, the portable communications device 100, the user of the portable communications device 100, and combinations thereof. The override settings may be received from the call controller 200 or another device external to the portable communications device 100. Alternatively or in addition, the override settings may be manually configured through the portable communications device 100 (e.g., through the user interface 101).

The user interface 101 may include a touch screen for displaying data and receiving user input. Alternatively or in addition, the user interface 101 may include one or more input mechanisms, such as a keyboard, a keypad, a button, a dial, a rotatable knob, and the like, for receiving user input. As described in more detail below, the user input may include selection of a communication group.

The transceiver 104 sends and receives data over one or more communication networks 108. The one or more communication networks 108 may include a wired communication network, a wireless communication network, or a combination thereof. For example, in some embodiments, the one or more communication networks 108 includes a land mobile radio (LMR) network, a terrestrial trunked radio (TETRA) network, or a digital mobile radio (DMR) network. The one or more communication networks 108 may also include a wide area network (WAN) (e.g., a transport control protocol/internet protocol (TCP/IP) based network, a cellular network, such as, for example, a Long-Term Evolution (LTE) network, a Global System for Mobile Communications (or Groupe Special Mobile (GSM)) network, a General Packet Radio Service (GPRS) network, a Code Division Multiple Access (CDMA) network, an Evolution-Data Optimized (EV-DO) network, an Enhanced Data Rates for GSM Evolution (EDGE) network, a 3GSM network, a 4GSM network, a Digital Enhanced Cordless Telecommunications (DECT) network, a Digital advanced mobile phone system (AMPS) (IS-136/time division multiple access (TDMA)) network, or an Integrated Digital Enhanced Network (iDEN) network, and the like). In other embodiments, the one or more communication networks 108 may include a local area network (LAN), a neighborhood area network (NAN), a home area network (HAN), or personal area network (PAN) employing any of a variety of communications protocols, such as Wi-Fi™, Bluetooth®, ZigBee®, and the like.

Figure 2:
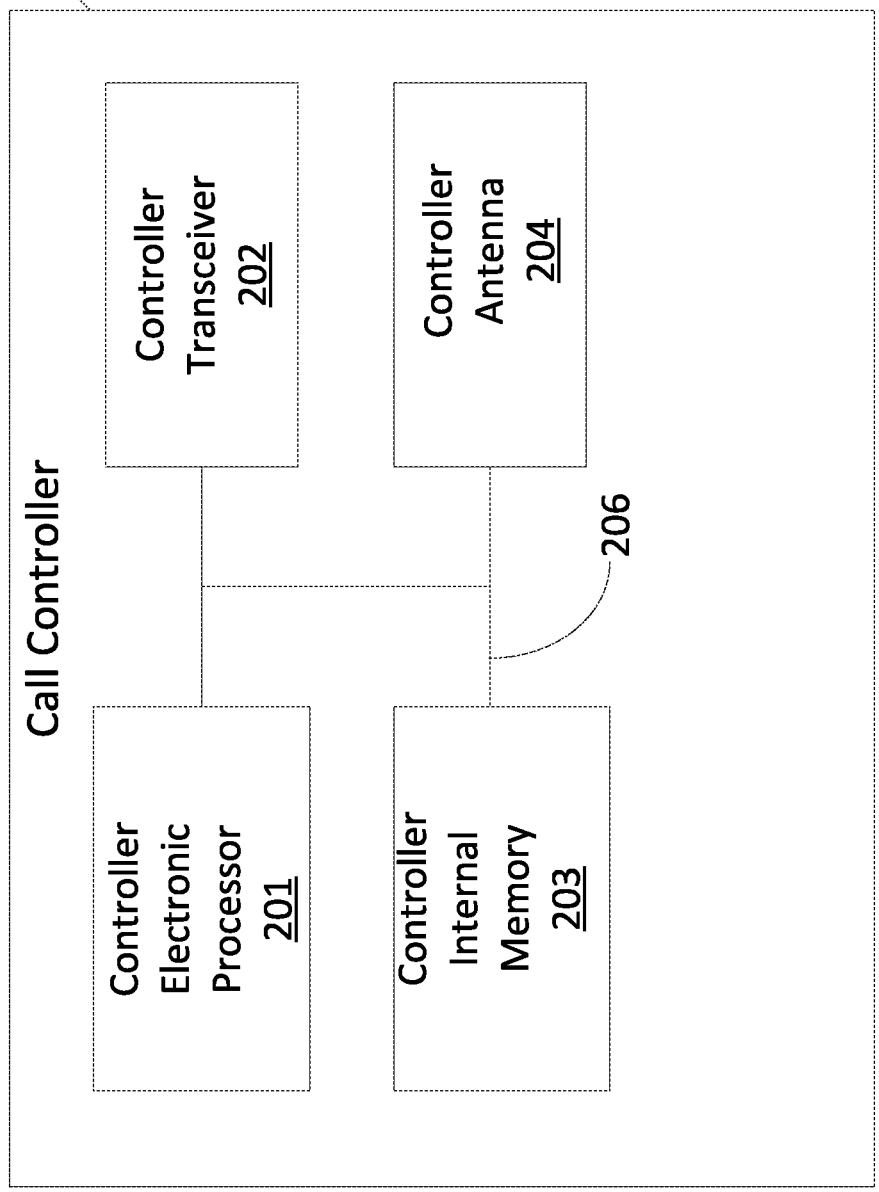
FIG. 2 is a block diagram of a controller in accordance with some embodiments.

FIG. 2 is a block diagram of a call controller 200. The call controller 200 may be a server that communicates with the portable communications device 100 as described below. For example, in some embodiments, the call controller 200 may be a dispatch controller used by a public safety organization, such as a fire department or a police department.

As illustrated in FIG. 2, the call controller 200 includes a controller electronic processor 202, a controller internal memory 203, a controller transceiver 204, and a controller antenna 205. In some embodiments, the call controller 200 also includes a controller user interface (not shown). The controller electronic processor 202, the controller internal memory 203, the controller transceiver 204, and the controller antenna 205 communicate over one or more wired or wireless connections (e.g., a controller communication bus 206). It should be understood that FIG. 2 illustrates one exemplary embodiment of the call controller 200. In other embodiments, the call controller 200 may include additional, fewer, or other components. Also, the functionality performed by the call controller 200 as described below may be distributed among multiple devices. Furthermore, the call controller 200 may perform functionality in addition to the functionality described herein.

The controller internal memory 203 includes a non-transitory computer readable medium that stores instructions executable by the controller electronic processor 202. In some embodiments, the controller internal memory 203 also stores data, such as forwarding configuration data, a plurality of talkgroups identifiers, and a status for each of the plurality of talkgroup identifiers, a status of an incident associated with each of the plurality of talkgroup identifiers, and the like. The controller transceiver 204 sends and receives data over the one or more communication networks 108. It should be understood that, in some embodiments, the call controller 200 communicates over additional, fewer, or different communication networks than the portable communications device 100.

As noted above, in some embodiments, the call controller 200 also includes a controller user interface (not shown), which may include a touch screen for displaying data and receiving user input, one or more input mechanisms, such as a keyboard, a keypad, a button, a dial, a rotatable knob, and the like for receiving user input, or a combination thereof. Alternatively or in addition, a separate computer console (e.g., a laptop computer, a desktop computer, a portable communications device, a computer terminal, and the like) may act as a remote controller user interface for the call controller 200. For example, a user may use a computer console to provide input to (e.g., make communication group assignments, set a status of a communication group, set forwarding configuration data for a communication group, and the like) and receive output from (e.g., view communication group assignments, communication group statuses, and the like) the call controller 200. The call controller 200 may communicate with the computer console over or a wired or wireless connection (e.g., the one or more communication networks 108).

Figure 3:
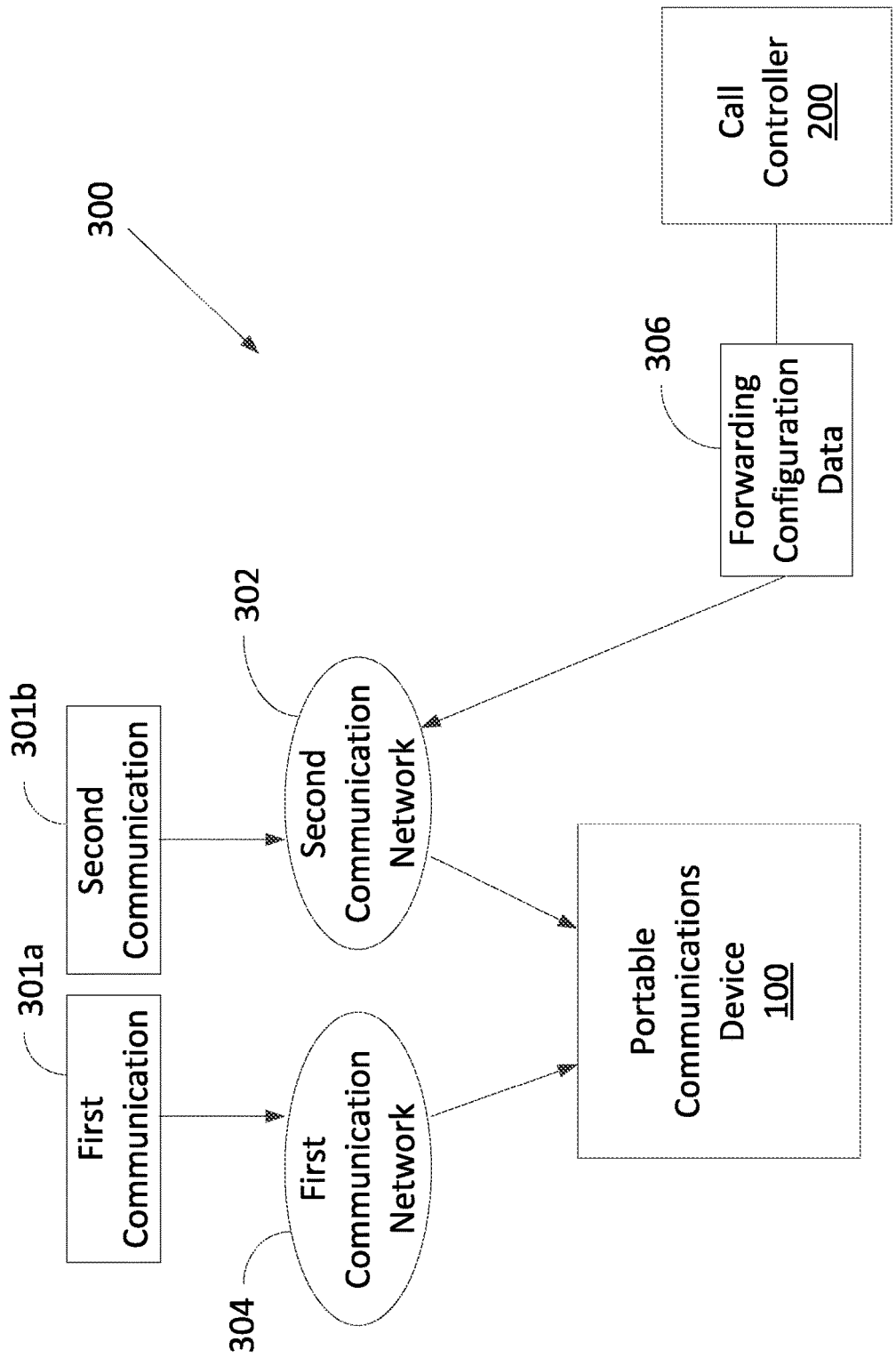
FIG. 3 is a block diagram of a system including the portable communications device of FIG. 1 and the controller of FIG. 2 in accordance with some embodiments.

FIG. 3 is a block diagram of a system 300 including the portable communications device 100 and the call controller 200. As noted above, both the portable communications device 100 and the call controller 200 communicate over the one or more communication networks 108. For example, in one embodiment, the portable communications device 100 and the call controller 200 communicate over a first communication network 302, and the portable communications device 100 also communicates over a second communication network 304. In some embodiments, the first communication network 302 is a cellular network, such as a Long-Term Evolution network, and the second communication network 304 is a radio network, such as a Land Mobile Radio network. It should be understood that, in some embodiments, the portable communications device 100 may communicate over more than two communication networks. Similarly, in some embodiments, the call controller 200 may communicate over more than one communication network. For example, in some embodiments, the call controller 200 also communicates over the second communication network 304.

As illustrated in FIG. 3, in some embodiments, the portable communications device 100 receives a first communication 301a over the first communication network 302 and receives a second communication 301b over the second communication network 304. The first communication 301a and the second communication 301b may include a talkgroup call, a telephone call, a text message, a voice mail message, a page, an email, a software application notification, and the like. Also, the first communication 301a may be the same type of communication as the second communication 301b or may be different. Also, it should be understood that the portable communications device 100 may receive multiple first communications 301a over the first communication network 302 (each of which may be the same or a different type of communication) and may receive multiple second communications 301b over the second communication network 304 (each of which may be the same or a different type of communication). It should also be understood that in some embodiments, the portable communications device 100 receives communications over fewer or additional communication networks. As described in more detail below, the portable communications device 100 may also receive forwarding configuration data 306 (e.g., over the second communication network 304) from the call controller 200.

The portable communications device 100 may join one or more talkgroups associated with the second communication network 304. As noted above, a talk group is a group of portable communications devices (e.g., created by an administrator through the call controller), in which each portable communications device in the talkgroup may participate in a group communication (e.g., a group call). In some embodiments, a talkgroup may communicate over a particular radio frequency channel. A talkgroup may relate to a particular public safety organization or department, a particular incident, a particular member role or designation, or a combination thereof. For example, a talkgroup may relate to an organization of first responders, a group of police officers, a fire incident, or a combination thereof. Similarly, a talkgroup may relate to members having the same role or designation (e.g., police officer, detective, supervisor, paramedic, firefighter, and the like). As another example, paramedics and firefighters might be grouped into two different talkgroups even though they are responding to the same public safety incident.

To be affiliated with a particular talkgroup (i.e., to join a talkgroup), the portable communications device 100 may receive input representing a user selection of a particular available talkgroup. For example, as noted above, the internal memory 103 of the portable communications device 100 may store a list of one or more available talkgroups (e.g., identifiers of available talkgroups with an assigned frequency or communication channel). The list of available talkgroups may be displayed on the user interface 101, and the user interface 101 may receive input from a user selecting one of the available talkgroups. Alternatively or in addition, available talkgroups may be assigned to discrete positions of a rotatable knob or other input mechanism included in the user interface 101 of the portable communications device 100 that receives input from a user selecting one of the positions. The electronic processor 102 determines the talkgroup associated with the selected position to select an available talkgroup. In some embodiments, the portable communications device 100 receives the list of available talkgroups (or a portion thereof including updates thereof) from the call controller 200.

In some embodiments, the portable communications device 100 may also automatically join a particular talkgroup based on instructions received from the call controller 200 or another device external to the portable communications device 100. For example, upon arriving at the scene of an incident, the call controller 200 may instruct the portable communications device 100 to join a talkgroup associated with the incident. Similarly, as a member associated with the portable communications device 100 is assigned to different organizations, departments, or roles, the call controller 200 may instruct the portable communications device to join a particular talkgroup.

As noted above, when a portable communications device 100 joins a particular talkgroup, it is desirable that the user of the portable communications device 100 not be distracted by receiving communications not associated with the talkgroup. For example, during a raid situation, members of a tactile team may not want their portable communications devices receiving and generating alerts for (e.g., a tone, a vibration, and the like) communications that are not associated with the raid situation (e.g., personal communications, communications sent to other talkgroups, or a combination thereof).

Accordingly, as described in more detail, the call controller 200 may send forwarding configuration data 306 to the portable communications device 100 based on talkgroup affiliation, and the portable communications device 100 may use the received forwarding configuration data 306 to forward received communications. The forwarding configuration data 306 associated with a talkgroup specifies when and where (e.g., another portable communications device, the call controller, a dispatch server, a voice mail server, and the like) to forward a communication transmitted to the portable communications device 100 while the portable communications device 100 is affiliated with the talkgroup. In some embodiments, as also described in more detail below, the portable communications device 100 applies the forwarding configuration data associated with the talkgroup and one or more override settings. As described above, the override settings allow the forwarding of a communication to be customized based on a current status of the talkgroup or an incident associated with the talkgroup, settings specific to the portable communications device 100, or settings specific to a user of the portable communications device 100. Hence, rather than being static, the forwarding configuration data are modified through the override settings to provide flexibility.

Figure 4:
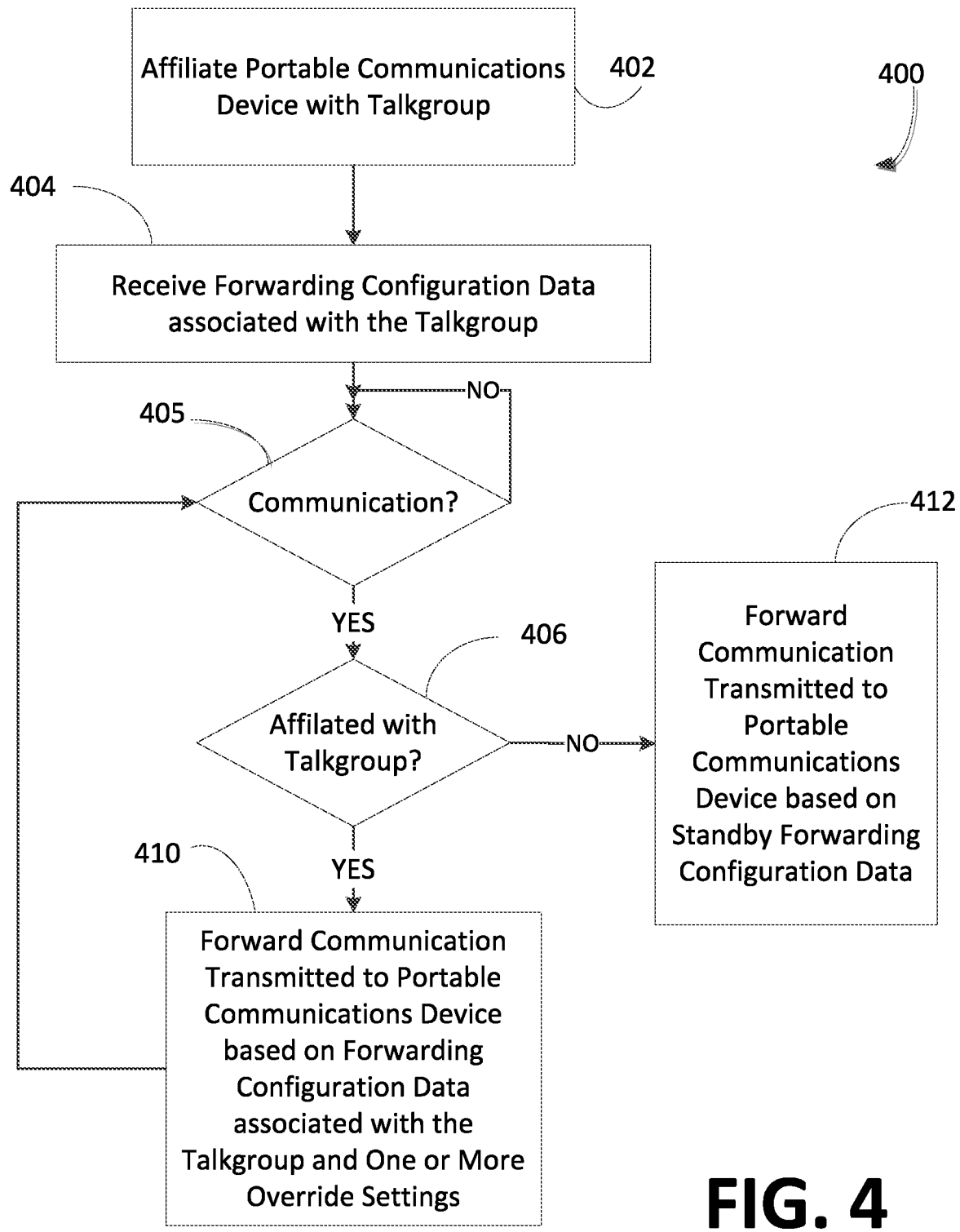
FIG. 4 is a flowchart illustrating a method of forwarding a communication transmitted to the portable communications device of FIG. 1 in accordance with some embodiments.

For example, FIG. 4 illustrates a method 400 for forwarding a communication transmitted to the portable communications device 100. The method 400 is described as being performed by the portable communications device 100. However, it should be understood that portions of the method 400 may be distributed among multiple devices, such as between the call controller 200 and the portable communications device 100.

As illustrated in FIG. 4, the method 400 includes affiliating the portable communications device 100 with a talkgroup (at block 402). As noted above, the portable communications device 100 may be affiliated with or join a talkgroup based on user input or in response to received instructions (e.g., from the call controller 200).

In response to affiliating the portable communications device 100 with the talkgroup, the portable communications device 100 (e.g., the electronic processor 102) receives forwarding configuration data 306 associated with the affiliated talkgroup (at block 404). In some embodiments, the portable communications device 100 receives the forwarding configuration data 306 from the call controller 200 (e.g., over the second communication network 304). For example, when the portable communications device 100 joins the talkgroup in response to user input, the portable communications device 100 notifies the call controller 200 of the joined talkgroup (e.g., by transmitting an identifier of the talkgroup to the call controller 200). The call controller 200 then determines forwarding configuration data 306 associated with the affiliated talkgroup and sends the forwarding configuration data 306 to the portable communications device 100. As noted above, in some embodiments, the controller internal memory 203 stores forwarding configuration data 306 for each of a plurality of talkgroups. Accordingly, when the call controller 200 receives an identifier of the talkgroup from the portable communications device 100, the call controller 200 identifies, based on data stored in the controller internal memory 203, the forwarding configuration data 306 associated with the identified talkgroup. In some embodiments, forwarding configuration data 306 may be associated with multiple talkgroups.

Alternatively or in addition, the call controller 200 (or a separate device) may query the portable communications device 100 for an identifier of an affiliated talkgroup. When the call controller 200 receives the identifier from the portable communications device 100, the call controller 200 identifies and sends the associated forwarding configuration data 306 as described above. Similarly, when the call controller 200 instructs the portable communications device 100 to join a particular talkgroup, the call controller 200 identifies and sends the associated forwarding configuration data 306 as described above.

Regardless of how the call controller 200 identifies the talkgroup affiliated with the portable communications device 100, the call controller 200 may store (e.g., in the controller internal memory 203) an identifier of the portable communications device 100 to track that the portable communications device 100 is affiliated with a particular talkgroup. As described in more detail below, the call controller 200 may use this stored information to provide the portable communications device 100 with updated forwarding configuration data 306.

Also, in some embodiments, the call controller 200 verifies that the portable communications device 100 (or the user of the portable communications device 100) is authorized to join the identified talkgroup. For example, the call controller 200 may store (e.g., in the controller internal memory 203) or access a list of identifiers of portable communications devices (or associated users) that are authorized to join a particular talkgroup, other requirements for joining a particular talkgroup (e.g., location of the portable communications device, communication capabilities of the portable communications device, and the like), or a combination thereof. Accordingly, the call controller 200 uses this information to verify whether the portable communications device 100 is authorized to join the selected talkgroup. When the call controller 200 determines that the portable communications device 100 is not authorized to join the selected talkgroup, the call controller 200 may send an alert to the portable communications device 100 and may not send forwarding communication data to the portable communications device 100.

Upon receiving the forwarding configuration data 306 from the call controller 200 through any of the methods described above, the portable communications device 100 stores the forwarding configuration data 306 (e.g., to the internal memory 103). Also, it should be understood that, in some embodiments, the portable communications device 100 receives the forwarding configuration data 306 from the internal memory 103. In other words, the internal memory 103 may be preprogrammed with forwarding configuration data 306 for one or more talkgroups. Similarly, in some embodiments, the portable communications device 100 may receive forwarding configuration data 306 for a plurality of talkgroups (e.g., from the call controller 200 or a separate device) and may store the forwarding configuration data 306 to the internal memory 103. The portable communications device 100 uses the stored forwarding configuration data 306 to determine applicable forwarding configuration data 306 for an affiliated talkgroup. Accordingly, when the portable communications device 100 joins a particular talkgroup, the portable communications device 100 receives the forwarding configuration data 306 from the internal memory 103, from the call controller 200, or a combination thereof.

As noted above, the forwarding configuration data 306 may specify whether and how a communication, such as the first communication 301a, transmitted to the portable communications device 100 is forwarded to another destination (e.g., another portable communications device, a dispatch controller, a voice mail server, and the like). Accordingly, as described in more detail below, when the first communication 301a is transmitted to the portable communications device 100, the electronic processor 102 may access to the stored forwarding configuration data 306 and determine whether the first communication 301a should be received and processed by the portable communications device 100 (e.g., the portable communications device 100 should generate an alert (e.g., a visual, audible, or tactile alert)) or whether the first communication 301a should be forwarded to another destination, such as another portable communications device, a dispatch controller such as the call controller 200, a voicemail server, and the like. It should be understood that the forwarding configuration data 306 may apply to the first communication 301a received through the first communication network 302, the second communication 301b received through the second communication network 304, or both. For example, when the first communication network 302 includes a cellular network and the second communication network 304 includes a radio network, the forwarding configuration data 306 associated with a talkgroup communicating over the radio network may apply to the first communication 301a received over the cellular network and the second communication 301b received over the radio network. However, in some embodiments, the forwarding configuration data 306 may include different forwarding configuration data for the first communication 301a received over the first communication network 302 than for the second communication 301b received over the second communication network 304. It should be understood that when the portable communications device 100 receives communications over each of a plurality of communication networks, the forwarding configuration data 306 may specify the same forwarding configuration data for each of the plurality of communications, different forwarding configuration data for each of the plurality of communications, and the like. Also, in some embodiments, the forwarding configuration data 306 may only specify forwarding configuration data for a subset of the plurality of communication networks.

Similarly, forwarding configuration data 306 may specify that particular types of communications or communications received from particular sources should be forwarded according to the forwarding configuration data 306. For example, communications from a supervisor or manger or communications identified as urgent (e.g., abort communications) may be exempt from forwarding according to the stored forwarding configuration data 306.

Similarly, in some embodiments, the forwarding configuration data 306 may apply to all portable communications devices 100 affiliated with a talkgroup or to a subset of affiliated portable communications devices 100. For example, different forwarding configuration data 306 may be provided to a portable communications device 100 associated with a particular talkgroup based on one or more filters, such as roles, assignments or designations, locations, active incidents, and the like. Accordingly, even when two portable communications devices are affiliated with the same talkgroup, each portable communications device may use different forwarding configuration data 306.

Also, the forwarding configuration data 306 used by a particular portable communications device 100 may specify whether the forwarding configuration data 306 may be overridden by the portable communications device 100 (e.g., in response to input received from a user of the portable communications device 100). For example, a portable communications device 100 may modify stored forwarding configuration data 306 (e.g., using one or more override settings) in response to user input to allow a user of the portable communications device 100 (e.g., a supervisor or manager) to receive certain communications that may otherwise be forwarded based on the stored forwarding configuration data 306.

Accordingly, as illustrated in FIG. 4, when a communication, such the first communication 301*a*, is transmitted to the portable communications device 100 (at block 405) while the portable communications device 100 is affiliated with the talkgroup (at block 406), the portable communications device 100 forwards the first communication 301*a* based on the stored forwarding configuration data 306 and one or more override settings (at block 410).

An override setting may be based on the talkgroup, such as a current status of the talkgroup. A talkgroup may have one of a plurality of statuses (e.g., active, inactive, dissolved, and the like). A current status of a talkgroup may be set manually (e.g., in response to user input received at the call controller 200, the portable communications device 100, or a combination thereof) or may be set automatically (e.g., based on a rate of messages, message content, and the like associated with the talkgroup) by the call controller 200, the portable communications device 100, another device, or a combination thereof. Accordingly, the first communication 301*a* transmitted to the portable communications device 100 may be handled (e.g., forwarded or not forwarded) differently depending on the status of the affiliated talkgroup. In particular, when a talkgroup has an inactive status, the forwarding configuration data 306 may specify that received first communication 301*a* is not forwarded. Alternatively, when a talkgroup has an active status, the forwarding configuration data 306 may specify that the first communication 301*a* is forwarded to another destination. Thus, in some embodiments, the first communication 301*a* is transmitted based on the forwarding configuration data associated with the talkgroup and the status of the talkgroup (at block 410).

Similarly, an override setting may include a status of an incident associated with a talkgroup. For example, an incident may have a status of critical, stable, resolved, and the like. In some embodiments, an incident status may be set manually or automatically similar to a talkgroup status. Accordingly, in some embodiments, the first communication 301*a* is transmitted based on the forwarding configuration data associated with the talkgroup and a status of an incident associated with the talkgroup (at block 410).

In some embodiments, the forwarding configuration data 306 received by the portable communications device 100 may include forwarding configuration data for each of a plurality of statuses (e.g., a status of a talkgroup, a status of an incident, or both). Accordingly, the portable communications device 100 may determine the current status (e.g., current status of the talkgroup, current status of the incident associated with the talkgroup, or both) and identify forwarding configuration data for one of the plurality of statuses matching the current status. The portable communications device 100 then forwards the first communication 301*a* based on the forwarding configuration data for the identified one of the plurality of statuses.

In other embodiments, the portable communications device 100 may determine a current status (e.g., repeatedly or in response to receiving the communication 301) and may request updated forwarding configuration data 306 from the call controller 200 for the current status (i.e., when forwarding configuration data 306 already stored on the portable communications device 100 does apply to the determined status, such as when the determined status is different from the status when the forwarding configuration data 306 was initially received from the call controller 200).

In some embodiments, the portable communications device 100 determines a current status (e.g., repetitively or when the first communication 301*a* is received). The portable communications device 100 may query the call controller 200 for data indicating a current status. Alternatively or in addition, the call controller 200 (or another device) may send data indicating a current status to the portable communications device 100 (e.g., repetitively or when the status changes). Also, in some embodiments, the call controller 200 may provide updated forwarding configuration data 306 when a status changes. The call controller 200 may also track what forwarding configuration data 306 has been provided to a particular portable communications device 100 to identify whether updated forwarding configuration data 306 should be provided in response to a status change.

The one or more override settings may also be based on the portable communications device 100. These types of override settings are not based on the talkgroup (e.g., a status) and, hence, the portable communications device 100 may not need to query the call controller 200 to apply these types of settings. Rather, these types of override settings are specific to the portable communications device 100 and may allow the portable communications device 100 to handle the first communication 301*a* differently than other members of the talkgroup. Accordingly, in some embodiments, the first communication 301*a* is transmitted based on the forwarding configuration data associated with the talkgroup and a setting specific to the portable communications device 100 (at block 410).

An override setting specific to the portable communications device 100 may be manually set (e.g., through the user interface 101). For example, a user of the portable communications device 100 may manually specify an override for particular communications (e.g., a communication received from a particular source or received during a particular time of day, and the like). Alternatively or in addition, these override settings may also be automatically set by the portable communications device 100 (e.g., programmed into the portable communications device 100, such as overrides based on a current battery level of the portable communications device 100) or by the call controller 200. For example, the call controller 200 may provide a particular portable communications device 100 with an override setting that modifies the forwarding configuration data 306 transmitted to that portable communications device 100 to provide the portable communications device 100 with custom forwarding configuration data as compared to other members of the talkgroup (e.g., to forward fewer or more communications, forward communications to different destinations, and the like).

Similarly, an override setting may be based on a role of a user of the portable communications device 100. For example, a manager or supervisor included in a talkgroup may want to receive more communications than other members of the talkgroup. Accordingly, in some embodiments, the first communication 301*a* is transmitted based on the forwarding configuration data associated with the talkgroup and a role of a user of the portable communications device 100 (at block 410).

For example, the forwarding configuration data 306 may include forwarding configuration data for each of a plurality of roles. Accordingly, when a communication is transmitted to the portable communications device 100, the portable communications device 100 may determine the role of the current user and identify one of the plurality of roles matching the role of the current user. The portable communications device 100 then uses the forwarding configuration data of the identified one role of the plurality of roles to forward the first communication 301*a*.

It should be understood that, in some embodiments, the portable communications device 100 determines the role of the current user based on data stored in the internal memory 103. Alternatively or in addition, the portable communications device 100 may access data stored externally (e.g., in the call controller 200 or another device) to identify the role of the current user.

As illustrated in FIG. 4, the method 400 repeats to apply the applicable forwarding configuration data and one or more override settings each time a communication is received. This functionality allows the forwarding of communications to be dynamically, customized rather than being applied statically. In some embodiments, the portable communications device 100 may be affiliated with multiple talkgroups. In these situations, the method 400 may be individually repeated for each talkgroup the portable communications device 100 is affiliated with. Similarly, for each talkgroup the portable communications device 100 is associated with, the method 400 may apply different forwarding configuration data, different override settings, or both.

As also illustrated in FIG. 4, in some embodiments, a talkgroup may be dissolved or a portable communications device may disassociate with a talkgroup. In these situations, as illustrated in FIG. 4, the portable communications device 100 may no longer apply the forwarding configuration data 306 associated with the talkgroup and may default to standby forwarding configuration data (e.g., stored in the internal memory 103) (at block 412). In some embodiments, the standby forwarding configuration data includes manually-specified forwarding configuration data or other default forwarding configuration data. In some embodiments, the override settings are also be applied to the standby forwarding configuration data.

Also, in some embodiments, the call controller 200 sends updated forwarding configuration data 306 to the portable communications device 100 when the forwarding configuration data 306 stored in the call controller 200 is updated. For example, when forwarding configuration data 306 for a particular talkgroup (or a particular status of a particular talkgroup) is updated through the call controller 200, the call controller 200 may identify one or more portable communications devices 100 affiliated with the talkgroup and send the identified portable communications device 100 the updated forwarding configuration data 306. Accordingly, the call controller 200 may provide all members of a talkgroup with updated forwarding configuration data to keep all members up-to-date.

It should be understood that the override settings described above can be applied individually or in combination. For example, the override settings may apply a status of the talkgroup and a role of a user of the portable communications device when forwarding a received communication.

Accordingly, embodiments provide methods, apparatuses, and systems for setting forwarding configuration data based on talkgroup affiliation and one or more override settings. Setting forwarding configuration data for a talkgroup is more efficient and accurate than allowing forwarding settings to be manually set at each portable communications device affiliated with a talkgroup. Also, within public safety situations, a user of a portable communications device may not have enough time to manually change forwarding configuration data or manually changing the forwarding configuration data may distract the user from a public safety incident. Accordingly, setting forwarding configuration data automatically as described above improves efficiency, accuracy, and overall talkgroup operation. Furthermore, the override settings prevent forwarding configuration data associated with a talkgroup from being static and, hence, unable to adapt to the needs of particular talkgroups or particular members of a talkgroup.

In the foregoing specification, specific embodiments have been described. However, one of ordinary skill in the art appreciates that various modifications and changes may be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment may be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method of forwarding a communication transmitted to a portable communications device, the method comprising:
    affiliating the portable communications device with a talkgroup;
    in response to affiliating the portable communications device with the talkgroup, receiving, at an electronic processor included in the portable communications device, forwarding configuration data associated with the talkgroup; and
    forwarding the communication transmitted to the portable communications device while the portable communications device is affiliated with the talkgroup based on the forwarding configuration data associated with the talkgroup and one or more override settings, the one or more override settings including a current status of the talkgroup;
    wherein the communication is not associated with the talkgroup;
    wherein the status of the talkgroup is one selected from the group consisting of active, inactive, and dissolved; and
    wherein, when the talkgroup has a dissolved status, the forwarding configuration data associated with the talkgroup is a standby forwarding configuration data.

2. The method of claim 1, further comprising, prior to forwarding the communication transmitted to the portable communications device, determining the current status of the talkgroup.

3. The method of claim 2, wherein determining the current status of the talkgroup includes receiving the current status of the talkgroup from a call controller over a communication network.

4. The method of claim 1, wherein receiving the forwarding configuration data associated with the talkgroup includes receiving forwarding configuration data for each of a plurality of statuses and wherein forwarding the communication transmitted to the portable communications device based on the forwarding configuration data associated with the talkgroup and the one or more override settings includes determining the current status of the talkgroup, identifying one of the plurality of statuses matching the current status of the talkgroup, and forwarding the communication based on the forwarding configuration data for the one of the plurality of statuses.

5. The method of claim 1, wherein forwarding the communication transmitted to the portable communications device based on the forwarding configuration data associated with the talkgroup and the one or more override settings includes forwarding the communication based on the forwarding configuration data associated with the talkgroup and a current status of an incident associated with the talkgroup.

6. The method of claim 1, wherein forwarding the communication transmitted to the portable communications device based on the forwarding configuration data associated with the talkgroup and the one or more override settings includes forwarding the communication based on the forwarding configuration data associated with the talkgroup and a setting specific to the portable communications device.

7. The method of claim 1, wherein forwarding the communication transmitted to the portable communications device based on the forwarding configuration data associated with the talkgroup and the one or more override settings includes forwarding the communication based on the forwarding configuration data associated with the talkgroup and a role of a user of the portable communications device.

8. The method of claim 1, wherein receiving the forwarding configuration data associated with the talkgroup includes receiving the forwarding configuration data associated with the talkgroup from a call controller over a communication network.

9. The method of claim 1, wherein receiving the forwarding configuration data includes receiving the forwarding configuration data from an internal memory of the portable communications device.

10. The method of claim 1, further comprising:
receiving the first communication on a first communication network associated with the talkgroup;
receiving a second communication on a second communication network, and
forwarding the second communication based on the forwarding configuration data and the one or more override settings.

11. The method of claim 1, further comprising receiving updated forwarding configuration data.

12. A portable communications device comprising:
a user interface for selecting a talkgroup;
an electronic processor; and
a memory coupled to the electronic processor and containing instructions that, when executed by the electronic processor, perform a set of functions including,
in response to selecting the talkgroup, receiving forwarding configuration data associated with the talkgroup, and
forwarding a communication transmitted to the portable communications device while the portable communications device is affiliated with the talkgroup based on the forwarding configuration data associated with the talkgroup and one or more override settings, the one or more override settings including a current status of the talkgroup;
wherein the communication is not associated with the talkgroup;
wherein the status of the talkgroup is one selected from the group consisting of active, inactive, and dissolved; and
wherein, when the talkgroup has a dissolved status, the forwarding configuration data associated with the talkgroup is a standby forwarding configuration data.

13. The portable communications device of claim 12, wherein the one or more override settings includes a current status of an incident associated with the talkgroup.

14. The portable communications device of claim 12, wherein the one or more override settings includes a setting specific to the portable communications device.

15. The portable communications device of claim 12, wherein the one or more override settings includes a role of a user of the portable communications device.

16. The portable communications device of claim 12, further comprising a transceiver receiving the forwarding configuration data associated with the talkgroup from a call controller over a communication network.

17. The portable communications device of claim 12, wherein the talkgroup communicates over a first communication network and wherein the communication is transmitted over a second communication network.

18. The portable communications device of claim 12, wherein the forwarding configuration data includes forwarding configuration data for each of a plurality of communication networks.

* * * * *